(12) United States Patent
Bell et al.

(10) Patent No.: US 8,622,176 B2
(45) Date of Patent: Jan. 7, 2014

(54) GEARBOX OIL RESERVOIR SHAPE OPTIMIZATION

(75) Inventors: Melissa A. Bell, San Diego, CA (US); Michael J. Rollins, Chula Vista, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 133 days.

(21) Appl. No.: 12/843,209

(22) Filed: Jul. 26, 2010

(65) Prior Publication Data

US 2012/0017722 A1 Jan. 26, 2012

(51) Int. Cl.
*F16N 31/00* (2006.01)
*F16H 57/04* (2010.01)
*F01M 1/02* (2006.01)

(52) U.S. Cl.
USPC ............. 184/106; 74/606 R; 123/196 R

(58) Field of Classification Search
USPC ........ 184/6.12, 106, 6; 74/606 R; 123/195 C, 123/196 R; 220/571, 573; 72/353.4, 357
IPC .................................................. F16N 31/00
See application file for complete search history.

(56) References Cited

U.S. PATENT DOCUMENTS

| | | | | |
|---|---|---|---|---|
| 4,674,457 A | * | 6/1987 | Berger et al. | 123/196 R |
| 4,938,184 A | * | 7/1990 | Martin et al. | 123/195 C |
| 4,995,971 A | * | 2/1991 | Droste et al. | 210/167.03 |
| 5,662,080 A | * | 9/1997 | Isono et al. | 123/195 C |
| 5,704,819 A | | 1/1998 | Isogawa | |
| D399,224 S | * | 10/1998 | Maynard | D15/150 |
| 5,924,901 A | | 7/1999 | Takahashi | |
| 6,568,509 B1 | | 5/2003 | Sugiura | |
| 6,626,021 B2 | | 9/2003 | Okuda | |
| 6,735,951 B2 | | 5/2004 | Thompson | |
| 6,874,549 B1 | * | 4/2005 | Williams | 141/98 |
| 7,093,447 B2 | | 8/2006 | Thompson | |
| 7,337,605 B2 | | 3/2008 | Hagshenas | |
| 7,367,193 B1 | | 5/2008 | Thompson | |
| 7,398,858 B2 | | 7/2008 | Bicker | |
| 7,654,241 B2 | | 2/2010 | Kobayashi | |
| 7,690,367 B2 | * | 4/2010 | Togasawa | 123/572 |
| 2004/0084250 A1 | * | 5/2004 | Morii et al. | 184/106 |
| 2007/0221159 A1 | * | 9/2007 | Tullis et al. | 123/195 R |
| 2009/0057064 A1 | * | 3/2009 | Ikeda | 184/106 |
| 2010/0066033 A1 | * | 3/2010 | Jessberger et al. | 277/591 |
| 2010/0181146 A1 | * | 7/2010 | Jessberger et al. | 184/106 |

* cited by examiner

*Primary Examiner* — William E Dondero
*Assistant Examiner* — Minh Truong
(74) *Attorney, Agent, or Firm* — Carlson, Gaskey & Olds, PC

(57) ABSTRACT

A gearbox for use in an auxiliary power unit has a plurality of gears received within a housing. A lube pump is mounted within the housing, and delivers oil to the plurality of gears and bearings. The lube pump has an oil supply tube for supplying oil to the pump for delivery to the plurality of gears and bearings. An oil reservoir maintains a quantity of oil above a lowermost end of the inlet tube, and is shaped such that a cross-sectional area at a lower end of the inlet tube has a first cross-sectional area. Other cross-sectional areas spaced upwardly from the first cross-sectional area are greater. A ratio of the second cross-sectional area to the first cross-sectional area is less than 3.

11 Claims, 6 Drawing Sheets

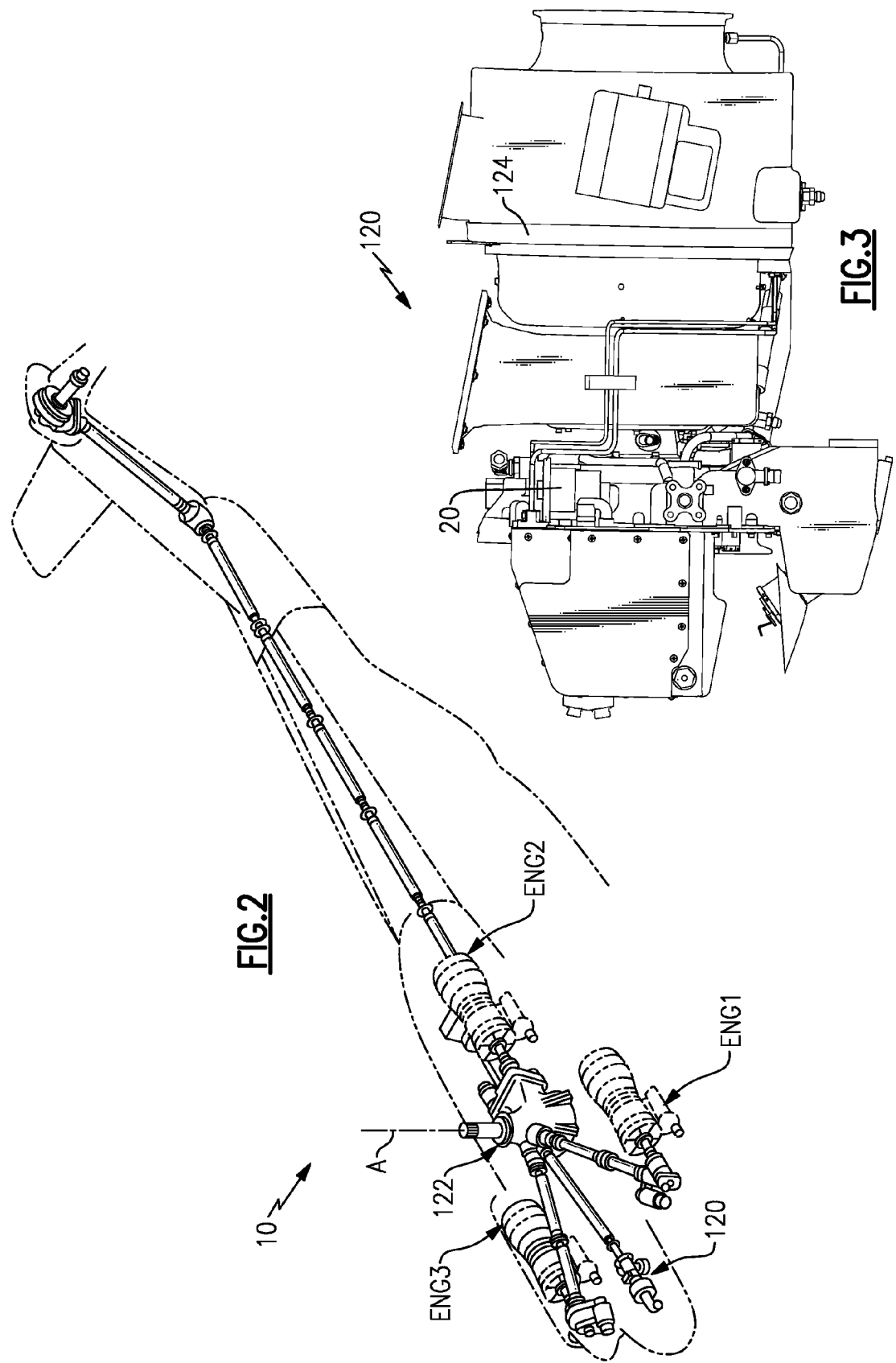

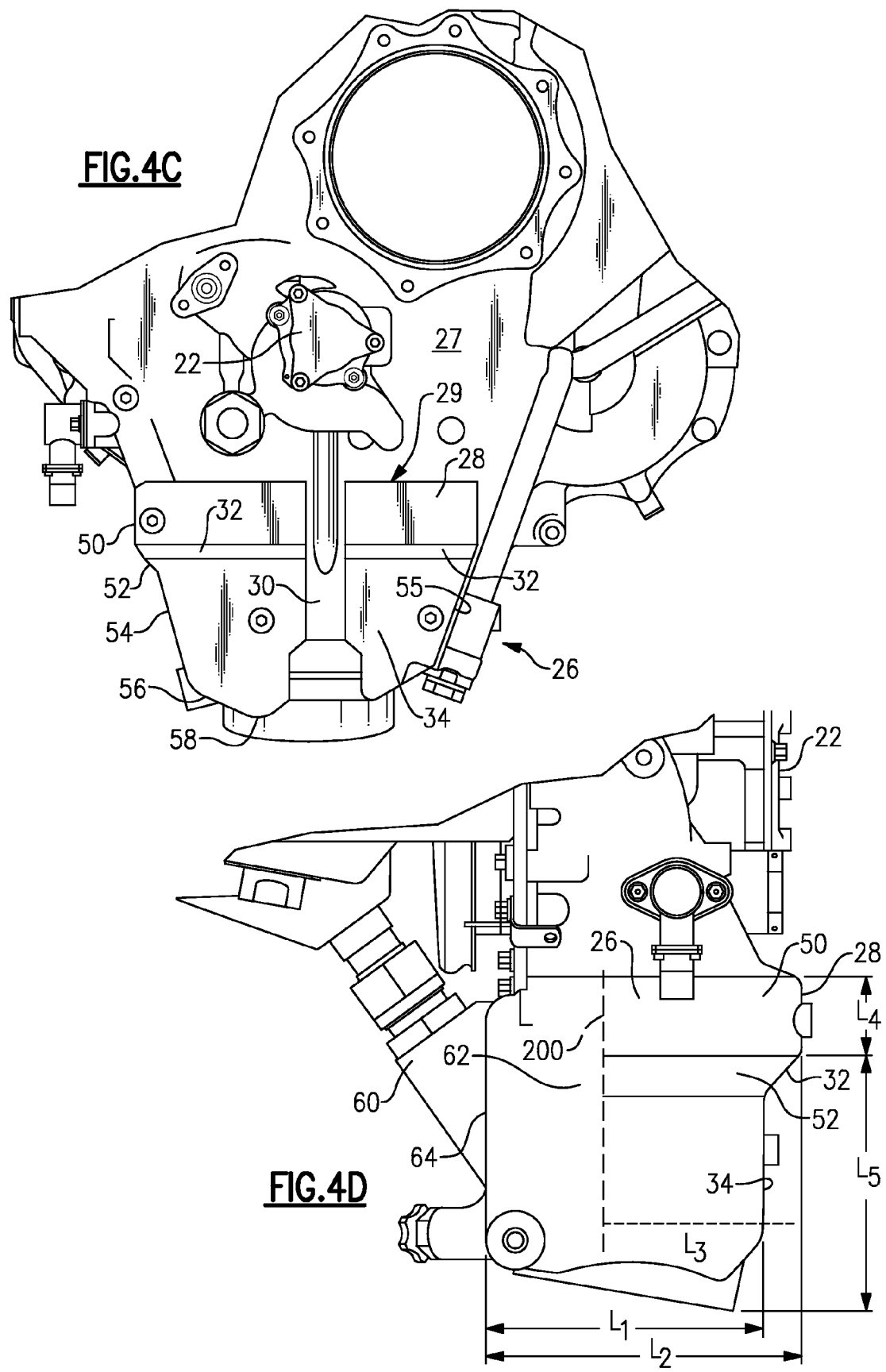

GEARBOX OIL RESERVOIR SHAPE OPTIMIZATION

STATEMENT OF GOVERNMENT INTEREST

This invention was made with government support under Contract No. N00019-06-C-0081 awarded by the United States Navy. The Government has certain rights in this invention.

BACKGROUND

This application relates to an oil reservoir for a gearbox, wherein the shape is optimized to ensure adequate oil flow even when a vehicle carrying the gearbox is put through extreme changes in orientation.

Modern aircraft, and in particular helicopters, must be able to perform a variety of extreme maneuvers. They must be able to have nose up and nose down, and left and right inclination attitudes. In addition, the attitudes may be combined between nose up/down and left/right inclination.

One component that is typically mounted on modern helicopters is an APU, or auxiliary power unit. An APU is a small gas turbine engine which generates electrical power. The APU includes a gear train mounted in a gear housing. The gear train is provided with a lubrication system, including a lube pump moving oil from an oil reservoir across the gear train.

An inlet tube takes oil from the reservoir and delivers it to the pump. The extreme changes in attitude that can occur with the use of such a system on a helicopter raise challenges with ensuring there is an adequate oil level to supply oil into the inlet tube. On the other hand, it is also important to not have too high an oil level. Typically, a designer would not want the gear train to be immersed in the oil.

SUMMARY

A gearbox for use in an auxiliary power unit has a plurality of gears and bearings received within a housing. A lube pump is mounted within the housing, and delivers oil to the plurality of gears and bearings. The lube pump has an oil supply inlet tube for supplying oil to the pump for delivery to the plurality of gears and bearings. An oil reservoir maintains a quantity of oil above a lowermost end of the inlet tube, and is shaped such that a cross-sectional area at a lower end of the inlet tube has a first cross-sectional area much smaller than that of the second. Other cross-sectional areas spaced upwardly from the first cross-sectional area are greater. A ratio of the second cross-sectional area to the first cross-sectional area is less than 3.

These and other features of the present invention can be best understood from the following specification and drawings, the following of which is a brief description.

BRIEF DESCRIPTION OF THE DRAWINGS

FIG. 2 is a partial phantom view of a power plant system for the exemplary rotor wing aircraft.

FIG. 3 is a side view of the exemplary auxiliary power unit.

FIG. 4C is a detailed view of the back of the gearbox as shown in FIG. 1A.

FIG. 4D shows a side view of the gearbox.

DETAILED DESCRIPTION

Figure 1:
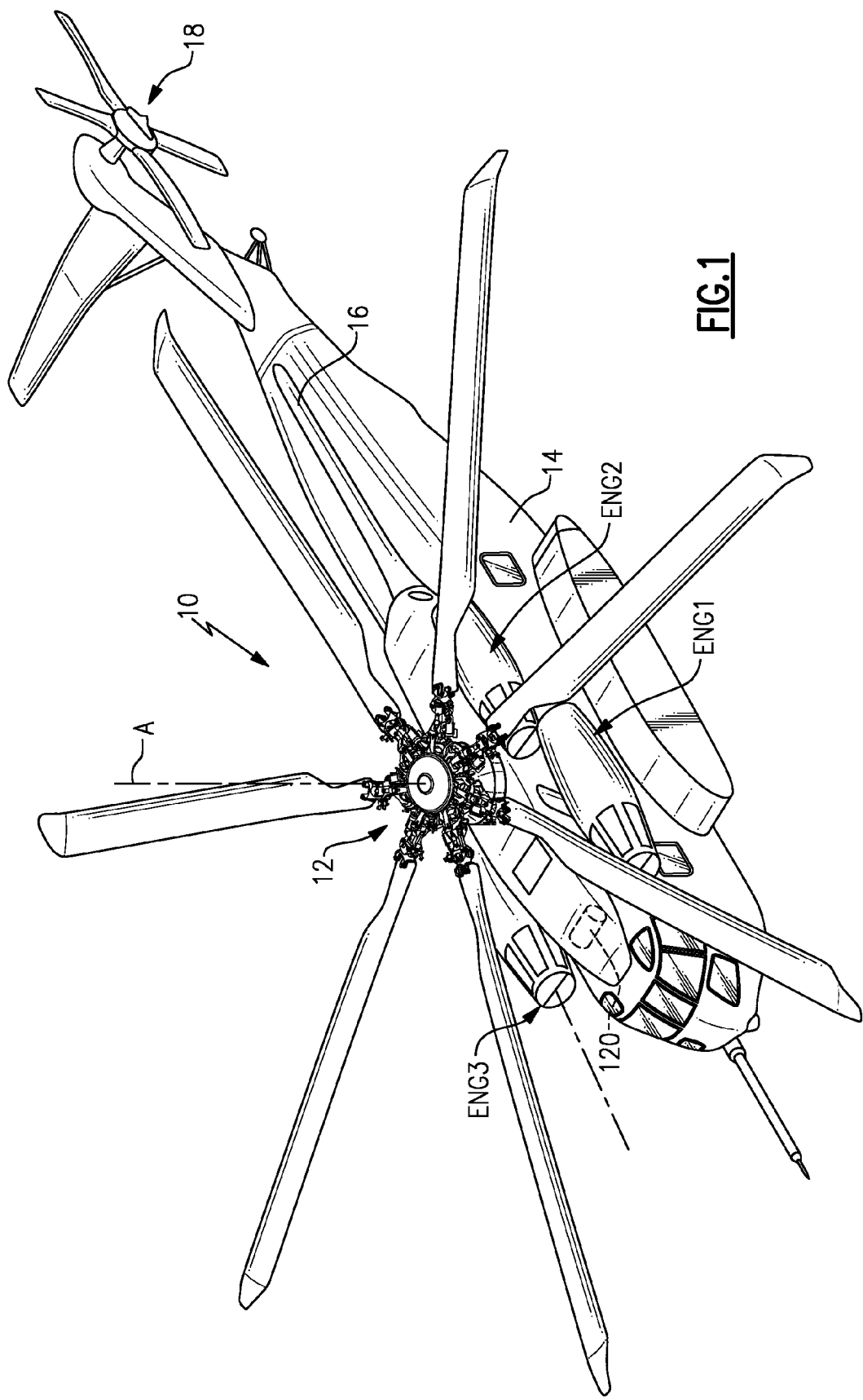
FIG. 1 is a perspective view of an exemplary rotor wing aircraft.

Referring to FIGS. 1 and 2, a rotary wing aircraft 10 includes a main rotor system 12, an airframe 14 and an extended tail 16. The extended tail 16 supports an anti-torque system 18. The main rotor system 12 is driven about an axis A by multiple power plants ENG1, ENG2 and ENG3. The power plants ENG1, ENG2 and ENG3 generate the power for flight operations and the APU 120 provides power utilized for operating various aircraft systems. Although a particular aircraft and power plant configuration is illustrated, other aircraft configurations and machines will also benefit from this disclosure. Operation of the example aircraft 10 includes high attitude orientations about the pitch and roll axes. Such high attitudes present challenges to the operation of systems that otherwise operate without issue at normal or less extreme orientations.

Referring to FIG. 3 with continued reference to FIGS. 1 and 2, the example APU 120 includes a gearbox 20 that is driven by a power plant 124. The example power plant 124 comprises a small gas turbine engine in comparison to the main propulsion power plants ENG1, ENG2 and ENG3. The gearbox 20 includes a plurality of gears that drive various pumps, generators and other aircraft systems. The gears operate at high speeds and require sufficient lubrication without becoming submerged within stored lubricant. Moreover, bearings supporting those gears also should not be completely submerged during operation. Submersion of rotating gears and bearings increases wear, reduces power output, and generates heat within the lubricant. Accordingly, the disclosed gearbox 20 includes features that prevent submersion of the gears and bearings during operation at extreme aircraft attitudes, but also ensures oil is available to be moved by an associated pump.

Figure 4A:
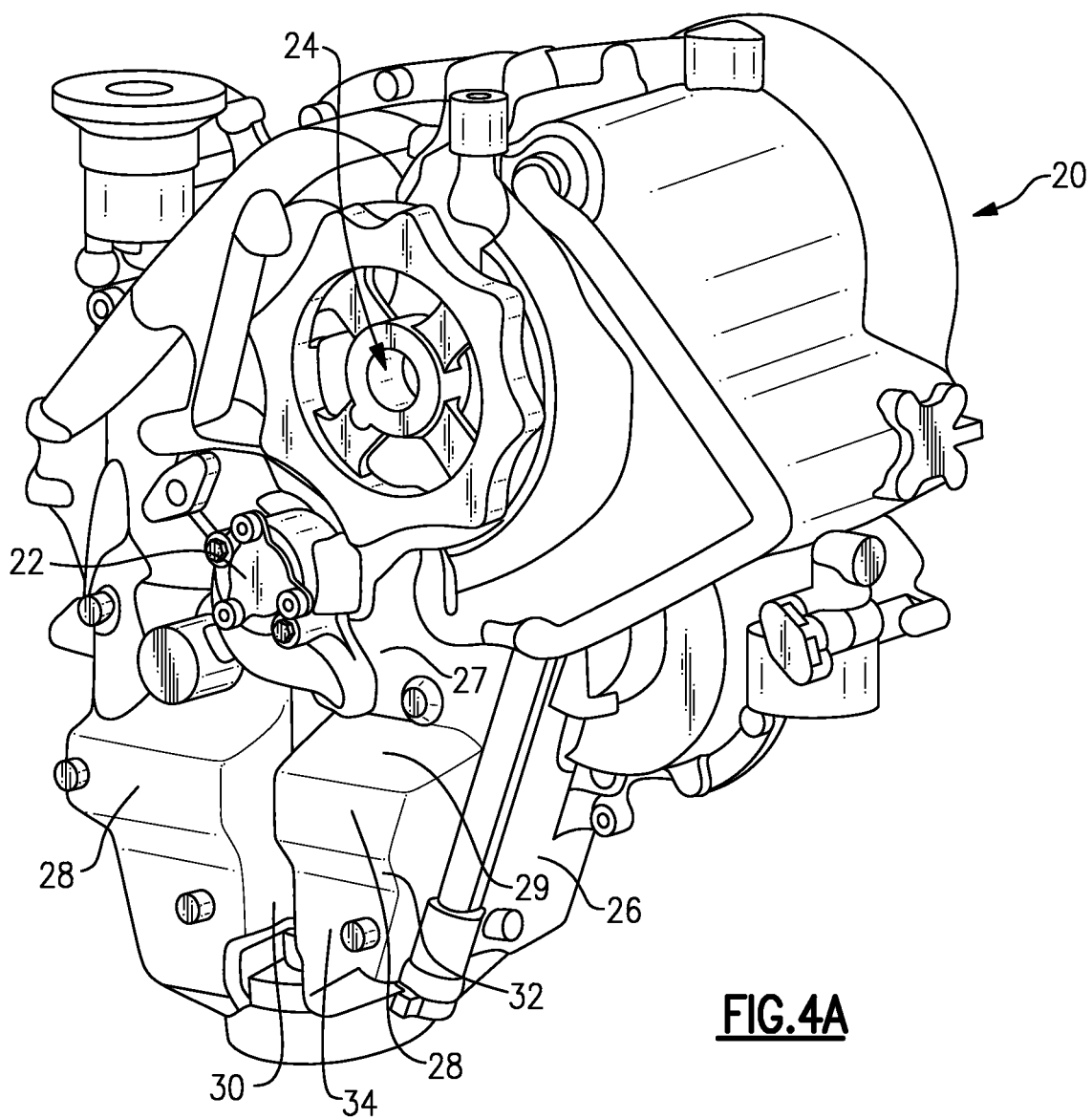
FIG. 4A is a back view of a gearbox such as for use on the APU.

A gearbox 20 is illustrated in FIG. 4A, and includes a lube pump 22 that takes oil from an oil reservoir 26, and delivers the oil upwardly across the gears and bearings in a gear train 24, shown schematically.

The oil reservoir 26 is configured to have an optimized shape such that oil will be available for supply to the lube pump 22 under any change of attitude of the aircraft 10 carrying the gearbox 20. On the other hand, it is also desirable that the oil level not reach the gear train 24, as the gears and bearings would churn and aerate the oil causing high oil temperature shutdowns. As such, the oil reservoir 26 is optimized such that it ensures oil will always be above a lowermost end of an oil supply tube, but below a lowermost end of the gear train 24.

To that end, the oil reservoir 26 includes enlarged portion 28 at a relatively upper part of the housing for oil reservoir 26. An intermediate channel 30 is formed between the enlarged rear portions 28 to assist in the producibility of the casting. A smaller back portion 34 of the rear face of the oil reservoir 26 does not extend as far from nominal face 27 of the back as does enlarged portion 28. As shown, the enlarged forward portion 28 ramps through a ramp portion 32 to a smaller portion 34.

Figure 4B:
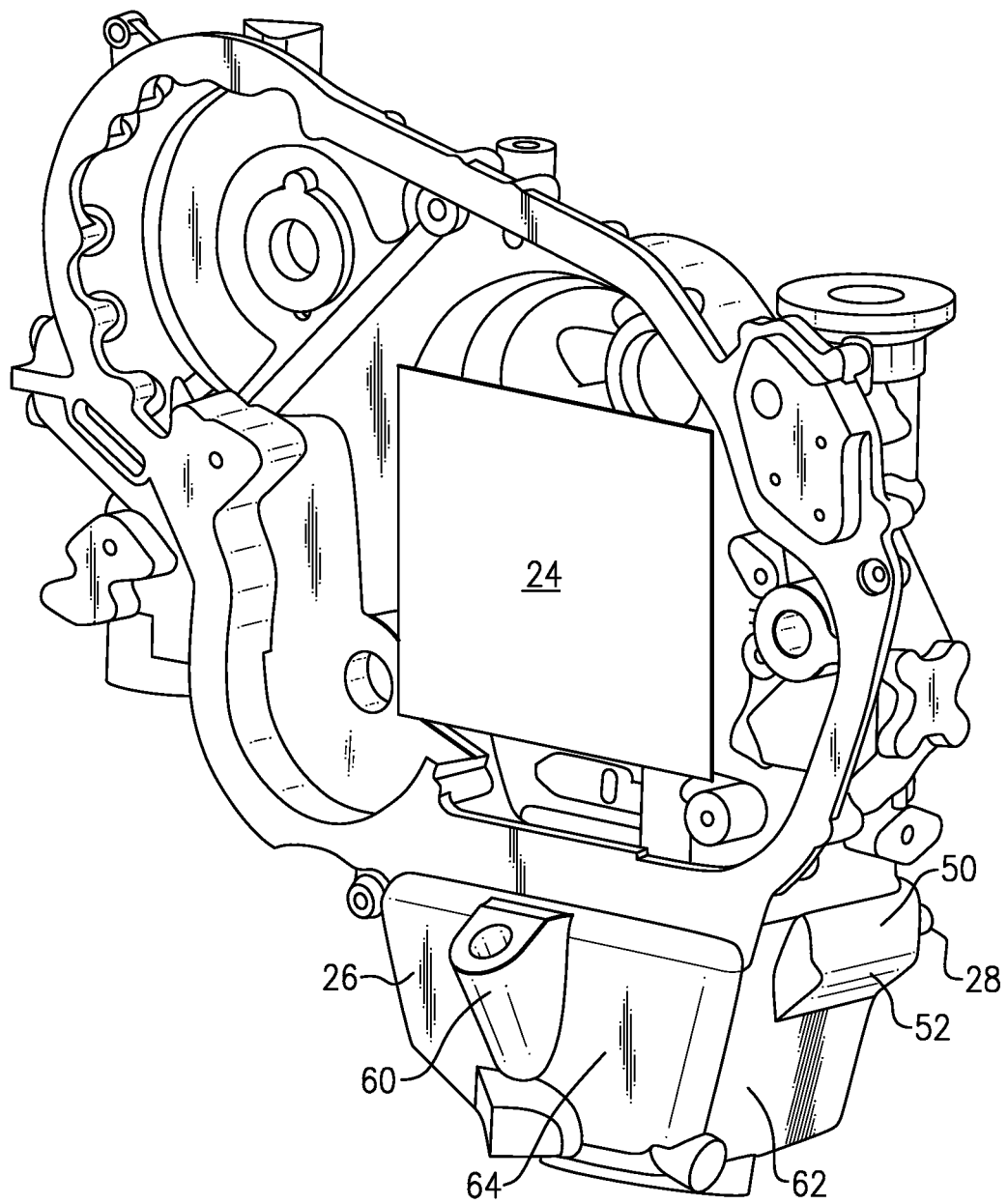
FIG. 4B is a front view of the gearbox assembly with front cover removed illustrated in FIG. 4A.

As shown in FIG. 4B, the enlarged portion 28 extends to enlarged sides 50 on the sides 62. Enlarged sides do not extend to front face 64, but instead end at point 200. A ramp 52 merges downwardly to a nominal side face 62. A front face 64 includes a fill opening 60 that allows oil to be delivered into the housing. Gear train 24 is shown including gears and bearings.

FIG. 4C shows the shape of the rear face, including the enlarged portions 28, and the ramped portions 32 ramping down to the smaller portions 34. In addition, the sides 54 and 55 of the back face can be seen to ramp inwardly below the enlarged sides 50 to a smaller, lower portion, and then ramp even further in at 56 to a lowermost point 58.

As can be appreciated from FIG. 4C, the oil reservoir 26 will have a smaller cross-sectional area at lower positions than it does at positions toward the top of the enlarged portions 28. The enlarged portions 28 further have top face 29 extending rearwardly to the nominal face 27.

As shown in FIG. 4D, a distance extending along a length of the rotational axis of the lube pump 22, and from the smaller portion 34 can be defined as L1. In one embodiment, L1 was 5.29" (13.44 cm). A distance L2 can be defined from the front face 64 to the rear end of the forward enlarged portion 28. In one embodiment, L2 was 6.04" (15.34 cm).

Another distance L3 can be defined from a forward end 200 of the enlarged side portion 50 to the rear end of enlarged portion 28. In one embodiment, L3 was 4.55" (11.55 cm).

A distance L4 can be defined as the distance along the enlarged portion 28 to the ramped portion 32. In one embodiment, L4 was 1.53" (3.89 cm). A distance L5 can be defined as the distance to the lowermost end of the oil reservoir 36 from the bottom of the enlarged portion 28 and the beginning of the ramped portion 32. In one embodiment, L5 was 4.87" (12.37 cm).

In embodiment, a ratio of L1 to L2 was between 0.8 and 0.9. A ratio of L4 to L5 was between 0.3 and 0.4. A ratio of L3 to L2 was between 0.7 and 0.8.

Figure 5:
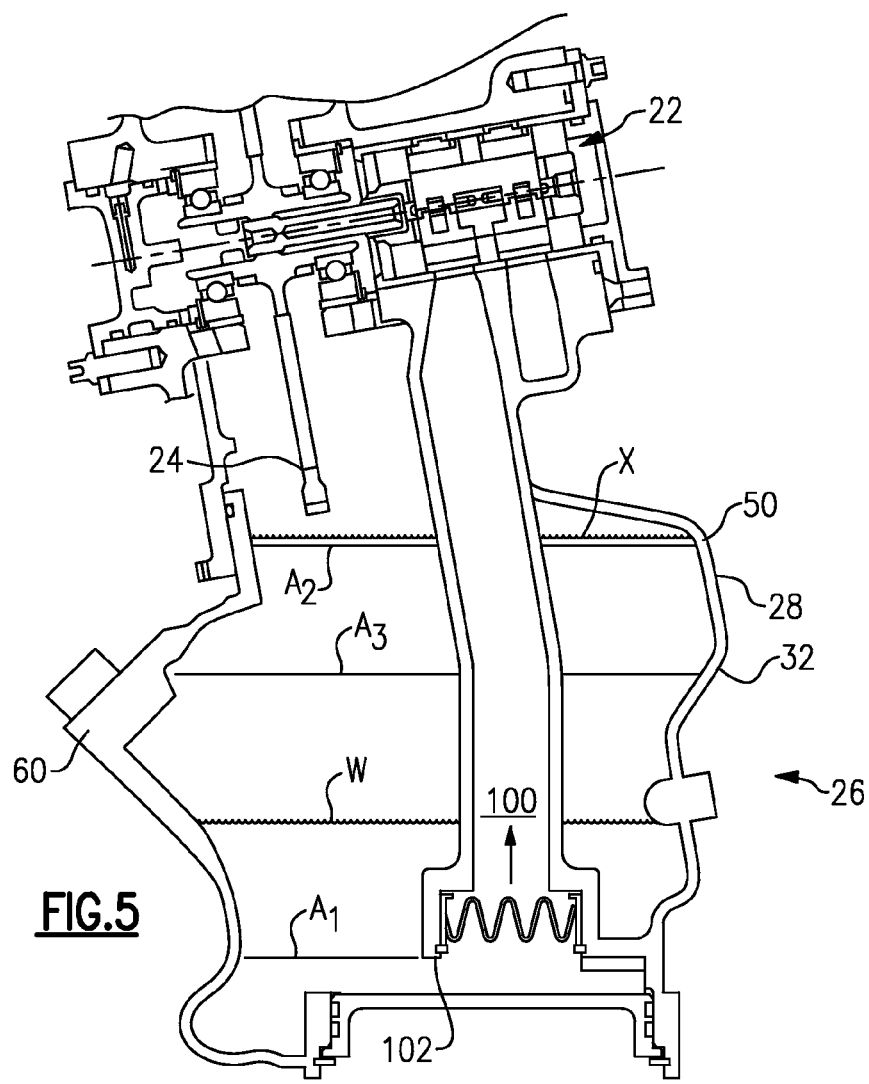
FIG. 5 schematically shows oil levels within the oil reservoir.

As shown in FIG. 5, a highest desired level of oil that would typically be provided within the oil reservoir 26 is shown at X. A worst case low oil level is also shown at W. The desired worst case line W is above a bottom 102 of an inlet tube 100. Inlet tube 100 delivers oil to the lube pump 22, shown schematically in this Figure.

As can be seen in FIG. 5, three cross-sectional areas $A_1$, $A_2$, and $A_3$ can be defined within the interior of the oil reservoir 26. $A_1$ is selected to be at the lowermost end 102. In one embodiment, $A_1$ has a cross-sectional area of 23.2 in$^2$ (149.6 cm$^2$). $A_3$ is selected to be at a location 5" (12.7 cm) above the bottom surface 102. In one embodiment, $A_3$ was 42.4 in$^2$ (273.5 cm$^2$). $A_2$ is selected to be adjacent to the oil fill line X. In one embodiment, $A_2$ was 40 in$^2$ (258 cm$^2$).

In embodiments of this invention, it is preferred that a ratio of $A_1$ to $A_2$ be less than 3, and between 1.5 and 2.5. It is preferred a ratio of $A_1$ to $A_3$ be between 0.5 and 0.6. $A_3$ could be the largest cross-sectional area, and is at a spot 75% between the $A_1$ area and the full line $A_2$.

With the oil reservoir 26 as shown, the smaller cross-sectional area in the lower portions, such as at $A_1$, ensures that even a minimum amount of oil in the reservoir 26 will maintain oil upwardly toward the worst case line W, and certainly above the bottom 102 at normal or extreme attitudes. Even a small quantity of oil will be sufficient to fill the small area $A_1$.

On the other hand, the larger cross-sectional areas, $A_2$ and $A_3$, for example, and all of the areas in the immediate vicinity, will ensure that even greater quantities of oil will not result in the fill line ramping upwardly and into the gear case, such that the gears themselves would be not submerged. That is, having dramatically larger cross-sectional areas ensures that a good deal more oil will be required to raise the level once the oil begins to reach into the larger cross-sectional area portions of the oil reservoir.

Figure 6:
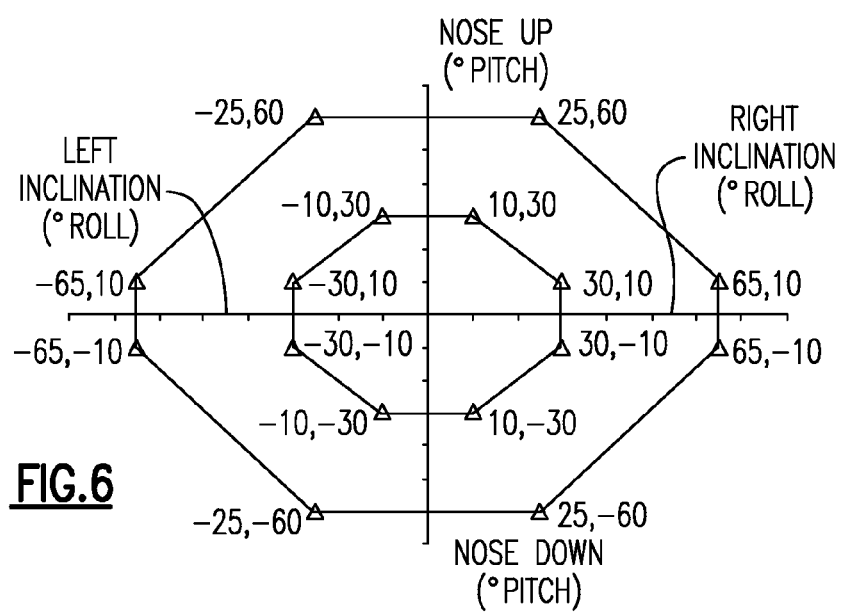
FIG. 6 shows examples of possible attitudes for a helicopter.

FIG. 6 shows the possible aircraft attitude limits for a modern helicopter. As shown, the helicopter might experience any combination of nose down or nose up, along with left or right inclination or roll. The interior portion of this graph shows conditions that must be provided for continuous operation, and that means long-term oil supply. The areas between the innermost shape and the outermost limit require operation for a predetermined limited period of time (30 seconds for example). With the shape-optimized oil reservoir of this application, these goals are achieved.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gearbox for use in an auxiliary power unit comprising:
a plurality of gears and bearings received within a housing;
a lube pump mounted within said housing, said lube pump configured to deliver oil to said plurality of gears and bearings, said lube pump including an inlet tube for supplying oil to said lube pump for delivery to said plurality of gears and bearings;
an oil reservoir configured to maintain a quantity of oil above a lowermost end of said inlet tube, said oil reservoir shaped such that a first flow cross-sectional area at a lower end of said inlet tube includes a first cross-sectional area, and said oil reservoir defining a second cross-sectional area upwardly from said first cross-sectional, the second cross-sectional area comprising a greater cross-sectional area than the first cross-section, with a ratio of said second cross-sectional area to said first cross-sectional area less than 3;
said oil reservoir including sides defined on lateral sides of a rotational axis of said lube pump, said lateral sides ramping toward each other from upper locations toward said first cross-sectional area, to result, in part, in the difference between said first and second cross-sectional areas;
said oil reservoir including enlarged portions extending away from a nominal face of said oil reservoir for a first distance in a direction measured along said rotational axis, with said enlarged portions ramping inwardly to a smaller portion spaced by a lesser second distance from said nominal face at locations closer to a location of said first cross-sectional area, to further result, in part, in the difference between said first and second cross-sectional areas; wherein a ratio of a distance from a forward face of said gearbox to a rear face of said enlarged portions relative to a distance from said forward face to a rear face of said smaller portion is between 0.8 and 0.9; wherein said enlarged portions on said rear face are separated by a channel on an outside wall of the housing; and wherein at least one of said enlarged portions extends around to an enlarged side on a lateral side of said oil reservoir, said enlarged side being enlarged relative to a nominal side surface, and extending toward, but not reaching, said forward face.

2. The gearbox as set forth in claim 1, wherein a ratio of said second cross-sectional area to said first cross-sectional area is between 1.5 and 2.5.

3. The gearbox as set forth in claim 1, wherein said enlarged side extends for a distance toward said forward face, and the distance from a rear face of said enlarged portion measured in a direction extending to the end of said enlarged side relative to the distance from said forward face to the rear face of said enlarged portion is between 0.7 and 0.8.

4. The gearbox as set forth in claim 3, wherein a third cross-sectional area adjacent an upper end of said oil reservoir relative to said first cross-sectional area is between 0.5 and 0.6.

5. The gearbox as set forth in claim 4, wherein said lateral sides beginning ramping towards each other from an upper location defined below a lowermost end of said enlarged portion.

6. The gearbox as set forth in claim 5, wherein the shape of said oil reservoir is selected to ensure there will be a level of oil above said lowermost end of said inlet tube, and below the plurality of gears and bearings within a range of aircraft attitude limits for continuous operation and time-limited maneuvers.

7. The gearbox as set forth in claim 1, wherein the shape of said oil reservoir is selected to ensure there will be a level of oil above said lowermost end of said inlet tube, and below the plurality of gears within a range of aircraft attitude limits for continuous operation and time-limited maneuvers.

8. A gearbox for use in an auxiliary power unit comprising:
a plurality of gears and bearings received within a housing;
a lube pump mounted within said housing, configured to deliver oil to said plurality of gears and bearings, said lube pump including an inlet tube for supplying oil to said lube pump for delivery to said plurality of gears and bearings;
an oil reservoir configured to maintain a quantity of oil above a lowermost end of said inlet tube, said oil reservoir shaped such that a first flow cross-sectional area at a lower end of said inlet tube has a first cross-sectional area, and said oil reservoir defining a second cross-sectional area upwardly from said first cross-sectional area of a greater cross-sectional area, with a ratio of said second cross-sectional area to said first cross-sectional area less than 3;
said oil reservoir including enlarged portions extending away from a nominal face of said oil reservoir, and in a direction measured along said rotational axis, with said enlarged portions ramping inwardly to a smaller portion spaced by a lesser distance from said nominal face at locations closer to a location of said first cross-sectional area; wherein a ratio of a distance from a forward face of said gearbox to a rear face of said enlarged portions relative to a distance from said forward face to a rear face of said smaller portion is between 0.8 and 0.9; wherein said enlarged portions are separated by a channel on an outside wall of the housing; and wherein at least one of said enlarged portions extends around to an enlarged side on a lateral side of said oil reservoir, said enlarged side being enlarged relative to a nominal side surface, and extending toward, but not reaching, said forward face.

9. The gearbox as set forth in claim 8, wherein said oil reservoir has lateral sides defined on each side of a rotational axis of said lube pump, and said lateral sides ramping towards each other beginning at a location beneath a lowermost end of said enlarged portions.

10. The gearbox as set forth in claim 8, wherein said enlarged side extends for a distance toward said forward face, and the distance from a rear face of said enlarged portion measured in a direction extending to the end of said enlarged side relative to the distance from said forward face to the rear face of said enlarged portion is between 0.7 and 0.8.

11. The gearbox as set forth in claim 10, wherein the shape of said oil reservoir is selected to ensure there will be a level of oil above said lowermost end of said oil supply tube, and below the plurality of gears within a range of aircraft attitude limits for continuous operation and time-limited maneuvers.

* * * * *